United States Patent

Thorsby

[11] 3,762,523
[45] Oct. 2, 1973

[54] MECHANICAL TRANSMISSION DEVICE
[76] Inventor: Claude A. Thorsby, 3150 Holland Rd., Saginaw, Mich. 48601
[22] Filed: July 26, 1972
[21] Appl. No.: 275,314

[52] U.S. Cl. .................. 192/139, 74/55, 74/416
[51] Int. Cl. ........................................... F16d 71/04
[58] Field of Search .................... 192/139; 74/10.2, 74/55, 351, 416, 526

[56] References Cited
UNITED STATES PATENTS

| | | | |
|---|---|---|---|
| 2,746,573 | 5/1956 | Hastings | 74/10.2 |
| 3,302,476 | 2/1967 | Williams | 74/351 X |
| 504,086 | 8/1893 | Johnson | 74/55 |
| 1,637,338 | 8/1927 | Fontaine | 192/139 |
| 2,164,309 | 7/1939 | Collins | 192/139 |
| 2,817,976 | 12/1957 | Fennimore et al. | 74/351 |
| 3,353,416 | 11/1967 | Flint et al. | 74/10.2 X |

FOREIGN PATENTS OR APPLICATIONS

| | | | |
|---|---|---|---|
| 1,251,386 | 12/1960 | France | 74/10.2 |

Primary Examiner—Allan D. Herrmann
Attorney—Warren E. Finken et al.

[57] ABSTRACT

A mechanical transmission device having an input gear and an output gear and a disabling arrangement for positively limiting the number of revolutions of the output gear, the disabling arrangement including a cam on the input gear defining a spiral groove with rigid abutments at each end, a follower pin pivotally supported on the transmission device and projecting into the spiral groove, and a slot in the frame of the transmission device closely slidably receiving the follower pin. As the cam rotates with the input gear, the distal end of the follower pin traverses a substantially linear path until engaging one of the rigid abutments whereupon the rigidity imparted to the pin by the side edges of the slot rotatably disables the cam, the input gear and the output gear.

2 Claims, 5 Drawing Figures

PATENTED OCT 2 1973　3,762,523

MECHANICAL TRANSMISSION DEVICE

This invention relates generally to rotary output transmission devices and more particularly to a stop arrangement within the device for positively limiting the number of output revolutions thereof.

A common technique employed for driving a rotatable element from a remote location involves connecting a flexible cable between the rotatable driven element and a rotary output device of some type, the cable functioning to transfer torque from the rotary output device to the driven element. In some particular applications, the driven element may be positively limited to only a particular number of revolutions so that continued rotation of the rotary output device after rotation of the driven element has been positively arrested initiates over-torquing or twisting of the flexible cable. A rotary output transmission device according to this invention represents an improvement over heretofore known similar devices and incorporates a positive stop arrangement which is synchronized or correlated with the driven element to stop the rotary output device just prior to the instant at which the driven element is disabled thereby to avoid over-torquing of the flexible cable.

Accordingly, the primary feature of this invention is that it provides an improved rotary output transmission device particularly adapted for powering a rotatable, driven element through a flexible rotary cable. Another feature of this invention is that it provides an improved rotary output device incorporating a positive stop arrangement for limiting to a predetermined number the number of revolutions of a rotary output member of the device. A further feature of this invention resides in the provision in the transmission device of a cam member operatively associated with the rotary output member and including a spiral groove of finite length, the groove being adapted to receive a follower member bodily movable in only one direction so that interference engagement between one or the other of the ends of the groove and the follower rotatably disables the cam and the rotary output member thereby positively arresting rotation of the rotary output member. These and other features of this invention will be readily apparent from the following specification and from the drawings wherein:

Figure 1:
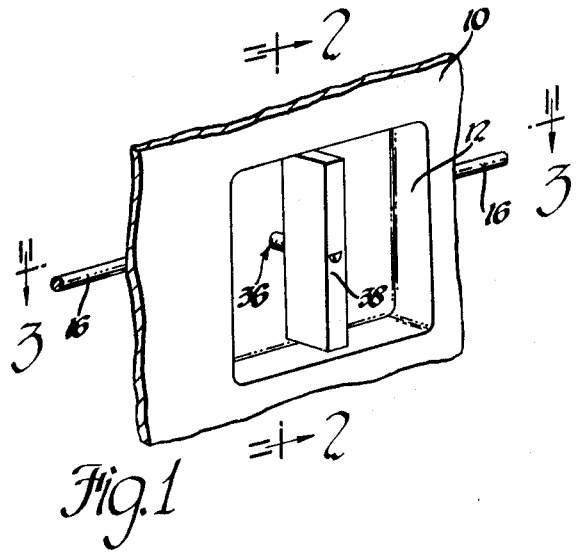
FIG. 1 is a perspective view of a typical installation of a rotary output transmission device according to this invention.

Referring now to FIG. 1 of the drawings, thereshown in fragmentary perspective view is a panel section 10 having therein a generally rectangular depression 12, the panel section 10 being merely representative of any appropriate mounting surface. Rigidly mounted on the back side of the panel section 10 behind the depression 12 is a rotary output mechanical transmission device according to this invention and designated generally 14, the transmission device 14 being adapted to effect rotation of a pair of rotary flexible cables 16 extending between the transmission device and each of two remote, rotatable elements, not shown. It will be understood that each of the remote elements is adapted to rotate through a predetermined number of revolutions in opposite directions after which each element is positively disabled so that no further rotation in that direction is possible.

Figure 2:
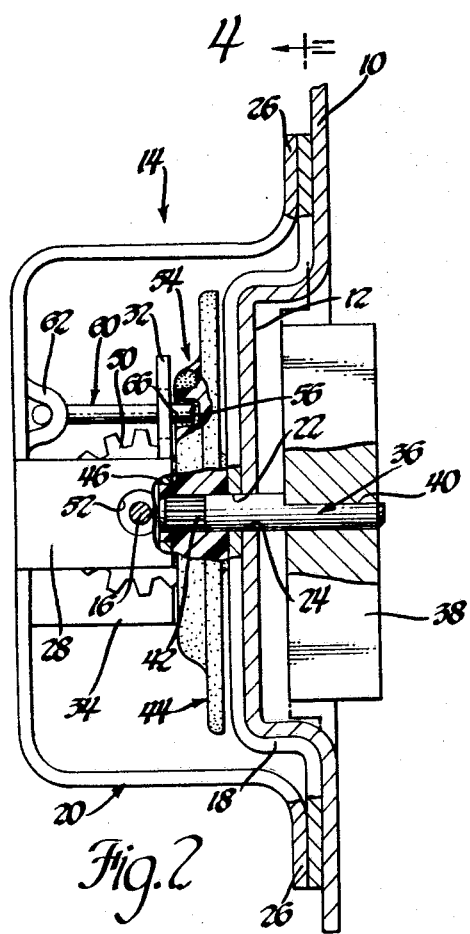
FIG. 2 is an enlarged partially broken away sectional view taken generally along the plane indicated by lines 2—2 in FIG. 1.
Figure 3:
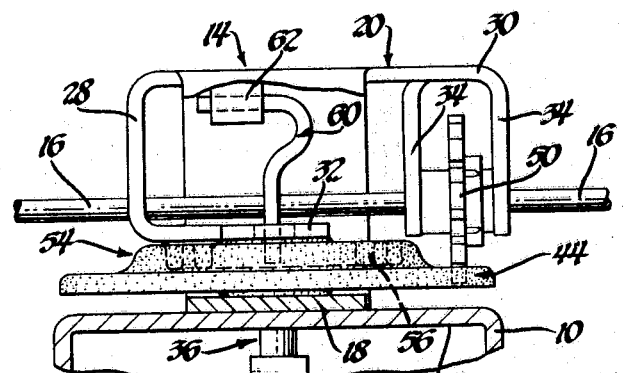
FIG. 3 is an enlarged partially broken away sectional view taken generally along the plane indicated by lines 3—3 in FIG. 1.
Figure 4:
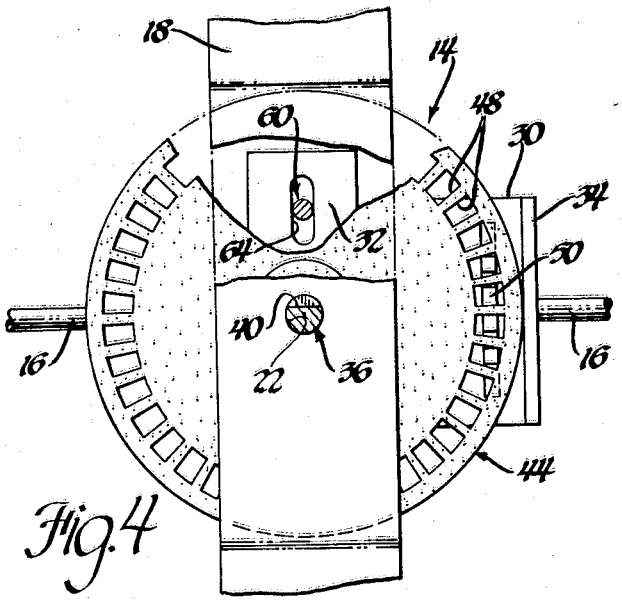
FIG. 4 is a partially broken away view taken generally along the plane indicated by lines 4—4 in FIG. 2.

As seen best in FIGS. 2, 3 and 4, the transmission device 14 includes a supporting frame structure consisting of a pair of preformed rigid straps 18 and 20. The strap 18 is disposed vertically behind the depression 12 of the panel section 10 in juxtaposition with the back side of the panel section and with an aperture 22 therein in registry with an aperture 24 centrally located in the innermost portion of the depression. The strap 20 is generally U-shaped in configuration and includes a pair of flanges 26 adapted for attachment to the panel section 10 by conventional threaded fasteners, not shown, which extend through aligned apertures in both the flanges 26 and the corresponding portions of the strap 18.

As seen best in FIGS. 2 and 3, the strap 20 further includes an integral first supporting leg 28 and an integral second supporting leg 30. The first leg 28 extends from the furthest rearward portion of the strap 20 toward the panel section 10 and is bent inwardly to define a generally vertically extending tab 32 oriented in a plane parallel to the plane of the panel section 10. The second leg 30 extends generally parallel to the plane of the panel section 10 and at the distal end thereof is formed into a pair of integral, laterally spaced support arms 34 which extend in parallel planes perpendicular to the plane of the panel section.

As best seen in FIG. 2, an intermediate section of a drive shaft 36 is rotatably journaled in the aperture 22 in the strap 18, a portion of the shaft projecting through the aperture 24 in the panel section 10 into the depression 12. A manual handle 38 disposed within the depression 12 is keyed to the drive shaft 36 at a D-section 40 of the latter for rotation as a unit with the drive shaft. Rearwardly of the strap 18, the drive shaft 36 has rigidly attached thereto, as by a press fit over a knurled section 42 on the shaft, an input member or ring gear 44. The ring gear has a reduced diameter portion 46, FIG. 2, rotatably journaled in an appropriate aperture in the tab 32 of the first leg 28 so that the drive shaft 36 and the ring gear 44 are rigidly and rotatably supported on the frame portion of the transmission device.

Figure 5:
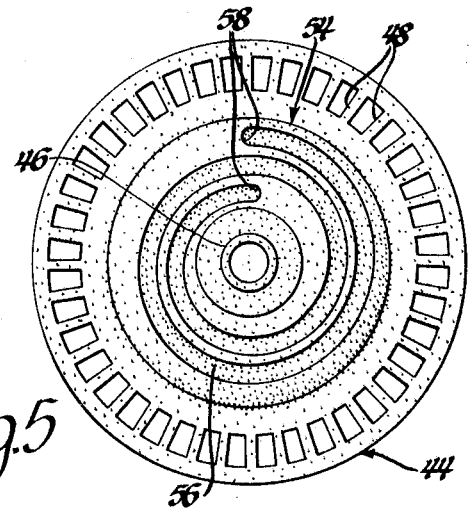
FIG. 5 is a view of a portion of the transmission device according to this invention showing the cam and spiral groove configuration.

Referring now to FIGS. 3 and 5, the ring gear 44 has formed therein a plurality of evenly spaced windows or notches 48 which notches are adapted for meshing engagement with the teeth of a driven gear or rotary output member 50. The output member 50 is rotatably supported by conventional bearing means, not shown, between the support arms 34 of the strap 20. Accordingly, when the ring gear 44 is rotated, as by the handle 38 through the drive shaft, simultaneous rotation of the output member 50 is effected. The ratio between the number of notches 38 in the ring gear and the number of teeth on the output member 50 is such, of course, that a single revolution of the ring gear 44 effects a plurality of revolutions of the output member 50. Each of the flexible rotary cables 16 is attached to the output member 50 for unitary rotation with the latter, one of the cables extending in one direction from the support arm 34 to one of the driven elements and the other of the cables 16 extending in the opposite direction through an aperture 52, FIG. 2, in the first leg 28 to the other of the driven elements.

As seen best in FIGS. 2, 3 and 5, the ring gear 44 has formed integrally therewith a generally circular raised cam 54, the cam having formed therein a curvilinear recess or groove 56 in the shape of a spiral of finite length bounded by a pair of end portions 58.

Referring now to FIGS. 2, 3 and 4, a hook shaped pin 60 is supported in a lanced out portion 62 of the strap 20 with the distal end of the pin disposed in the groove 56 and for pivotal movement about an axis of the frame portion of the transmission device extending generally perpendicularly with respect to the axis of rotation of the drive shaft 36. The lanced out portion 62, while supporting the pin 60 for pivotal movement, also functions generally to prevent lateral movement of the pin so that as the ring gear 44 and cam 54 are rotated, the pin 60 is caused to pivot in a plane generally perpendicular to the plane of the ring gear 44 and the cam 54. However, to further rigidify the pin 60 in the lateral direction, a slot 64, FIG. 4, is provided in tab 32 through which the pin 60 projects.

The slot 64 closely receives the pin 60 so that the latter has substantially no lateral play or looseness. Accordingly, when one or the other of the ends 58 of the groove 56 engages the distal end of the pin 60, the latter forms a rigid abutment preventing further rotation of the ring gear and the cam in that particular direction. In effect, then, the portion of the pin 60 projecting beyond the tab 32 and into the groove 56 defines a cam follower 66 which experiences substantially vertical, linear bodily shiftable movement in a vertical plane containing the axis of rotation of the cam and the drive shaft in response to rotation of the cam.

The length of the groove 56 is determined by the permissible number of revolutions of the driven elements, not shown, and the gear ratio between the ring gear 44 and the output member 50. More particularly, since the flexible cables 16 connect the output member 50 and the driven elements for unitary rotation, the gear ratio between the output member and the ring gear establishes the exact number of revolutions of the ring gear required to just produce the permissible number of output revolutions of the output member 50 and the driven elements. The length of the groove 56, then, must be sufficient to provide a spiral wherein the number of levels equals the desired number of revolutions of the ring gear. Referring to FIG. 5, the spiral defined by groove 56 in the cam has two levels which permit two complete revolutions of the ring gear.

Describing now the operation of the transmission device 14, when it is desired to effect rotation of each of the flexible cables 16, the manual handle 38 is grasped and rotated in the direction which will effect rotation of the driven elements in the desired direction. Rotation of the handle, of course, effects concurrent rotation of the ring gear 44 and the output member 50 thereby rotating the flexible cables. Simultaneously, the cam 54 is rotated as a unit with the ring gear with the spiral groove 56 effecting virtual bodily movement of the follower 66. After a predetermined number of revolutions of the handle 38 and the ring gear 44, one or the other of the ends 58 of the slot 56 engages the follower 66 and exerts thereon a force urging lateral movement of the follower. The follower, however, is relatively rigidly supported in the lateral direction by the sides of slot 64 and thus positively prevents continued rotation of the cam and the ring gear and hence the output member 50. As recited hereinbefore, the length of the groove 56 is correlated with the number of permissible revolutions of the driven elements such that rotation of the output member is arrested by the follower 66 through the cam and the ring gear just prior to the instant at which the rotation of the driven elements would be arrested. Accordingly, there is no tendency to drive the driven elements to their absolute extreme positions and, of course, no tendency to thereby over-torque the flexible rotary cables 16.

It will be apparent to those skilled in the art that the transmission device according to this invention may be power operated as opposed to the manually operated embodiment described hereinbefore. More particularly, instead of a manual handle 38, the drive shaft 36 could be connected to a reversible electric motor. In such an installation, the cam follower functions to stall the motor by positively disabling the cam and ring gear in a manner identical to that described hereinbefore with respect to the manual handle 38, the stalling of the motor normally being sufficiently audible to alert the operator to the fact that further energization of the motor is unnecessary.

Having thus described the invention, what is claimed is:

1. In a mechanical transmission device having a rotary input means and a rotary output means rotatable in response to rotation of said input means, the combination comprising, a cam defining a spiral recess of finite length bounded on opposite ends by respective ones of a pair of rigid abutments, means rigidly attaching said cam to said rotary input means so that said cam is rotatable as a unit therewith about an axis of said transmission device and so that rotary disablement of said cam effects concurrent rotary disablement of said input means and said output means, a follower pin disposed on said transmission device for pivotal movement about an axis oriented generally perpendicularly with respect to the axis of rotation of said cam, means on the distal end of said follower pin defining a cam follower portion adapted for projection into said spiral recess so that said cam follower portion undergoes substantially linear bodily shiftable motion in a plane containing the axis of rotation of said cam in response to rotation of the latter, and means on said transmission device engageable on said follower pin and adapted for imparting to the latter substantial rigidity in a direction generally perpendicular to the direction of linear bodily shiftable motion of said cam follower portion so that engagement between said cam follower portion and either one of said rigid abutments effects rotary disablement of said cam and corresponding rotary disablement of said input means and said output means after a predetermined number of revolutions of the latter.

2. In a rotary output mechanical transmission device, the combination comprising, a frame, an input gear disposed on said frame for rotation about a first axis of said frame, an output gear disposed on said frame for rotation about a second axis of said frame oriented generally perpendicularly with respect to said first axis, said output gear meshingly engaging said input gear thereby to establish therebetween a positive driving and driven relationship, means defining on said input gear a spiral groove of finite length bounded on opposite ends by respective ones of a pair of rigid abutments and rotatable with said input gear about said first axis, a follower pin, means mounting said follower pin on said frame for pivotal movement about a third axis of the latter oriented generally perpendicularly with respect to said first axis, the distal end of said follower pin defining a cam follower portion adapted for projection into said spiral groove so that said cam follower portion undergoes substantially linear bodily shiftable motion in a plane containing said first axis in response to rotation of said input gear, and means on said frame defining a slot disposed in a plane perpendicular to said first axis and oriented generally along the path of linear bodily shiftable motion of said cam follower portion, said slot closely and slidably receiving therethrough said follower pin thereby to impart to said cam follower portion substantial rigidity in a direction generally perpendicular to the direction of linear bodily shiftable motion of said cam follower portion so that engagement between said cam follower portion and either one of said rigid abutments effects rotary disablement of said cam and corresponding rotary disablement of said input gear and said output gear after a predetermined number of revolutions of the latter.

* * * * *